April 27, 1937. S. W. MARSH ET AL 2,078,399
SAW SET AND SAW FILING GAUGE
Filed Sept. 19, 1935
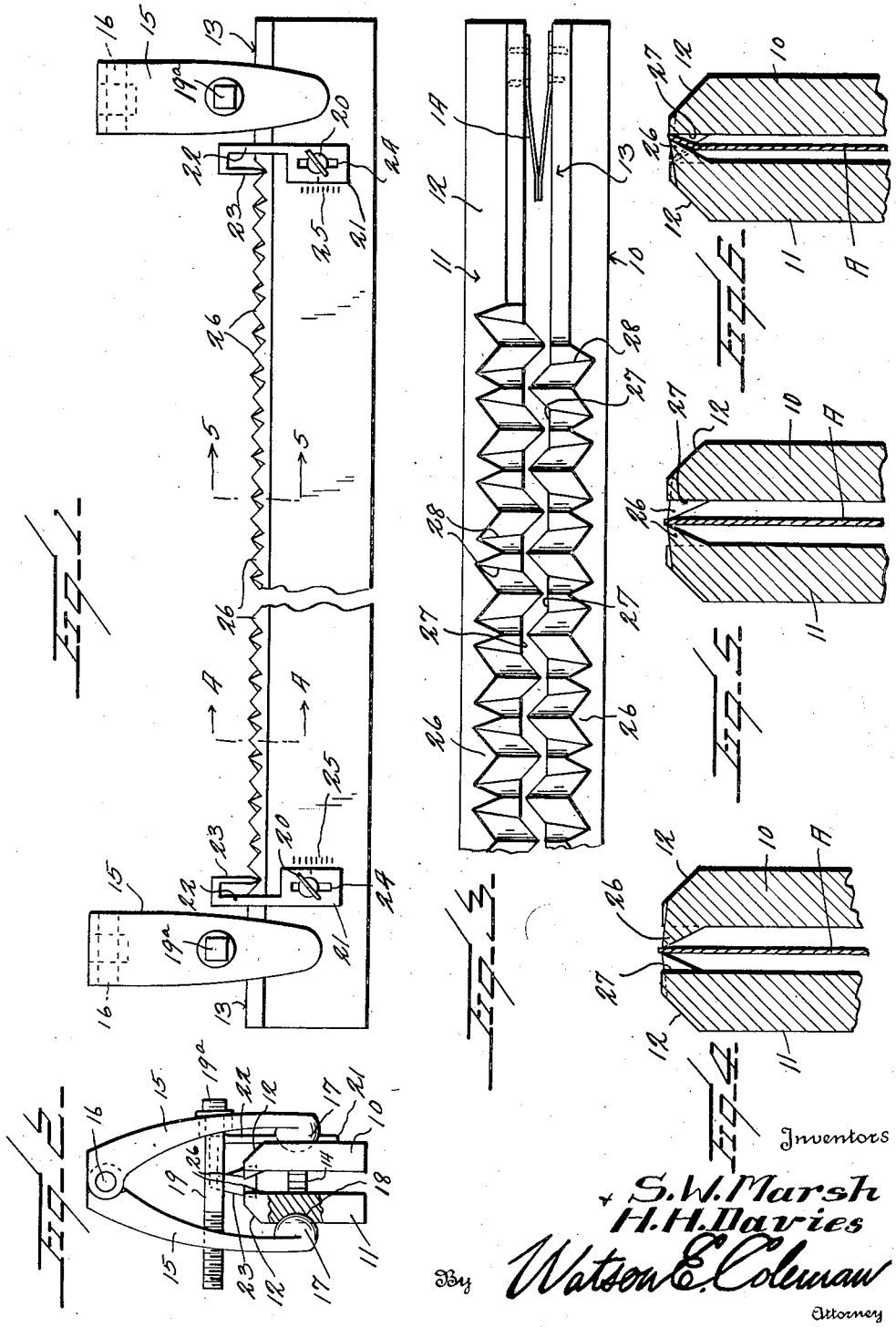
Inventors
S. W. Marsh
H. H. Davies
By Watson E. Coleman
Attorney Patented Apr. 27, 1937

2,078,399

UNITED STATES PATENT OFFICE 2,078,399

SAW SET AND SAW FILING GAUGE

Stanley W. Marsh and Harry H. Davies, Valley Falls, Kans.

Application September 19, 1935, Serial No. 41,310

5 Claims. (Cl. 76—46)

This invention relates to saw setting and saw floating devices and particularly to a device of this character which includes opposed saw clamping jaws or dies, the upper marginal face of each die being formed with a series of saw tooth engaging and bending projections and alternate flat intermediate faces, the projections on one die being complementary to the intermediate portions between the projections of the other die whereby when the dies are brought together alternate teeth of the saw will be bent in opposite directions and to the correct angle for that particular size of saw.

The object of the present invention is to provide, on the upper edge face of each die, a series of notches angularly disposed with relation to the inner face of the jaw or die and disposed between and defining said lugs or projections of the die, these notches acting as file guides, the notches being V-shaped to accommodate the notch to the shape of the file and to give a triangular form to the projections of the two dies.

A further object is to provide simple means whereby the dies or jaws may be brought together and provide depth gauges at opposite ends of the jaws or dies to control the position of the saw between the dies.

Other objects will appear in the course of the following description.

Our invention is illustrated in the accompanying drawing wherein:

Figure 1 is a side elevation of the improved saw set device;

Figure 2 is an end elevation of the same, one of the jaws being partly broken away;

Figure 3 is a top plan view of the opposed jaws spread apart;

Figure 4 is a sectional view on the line 4—4 of Figure 1 and showing the jaws spread apart but with a saw between the jaws;

Figure 5 is a like view to Figure 4 but taken on the line 5—5 of Figure 1;

Figure 6 is a like view to Figure 5 but showing the jaws forced together to bend or set the teeth of the saw.

Referring to this drawing, 10 designates one jaw of our device and 11 the opposed jaw. These jaws are alike except as regards the relative position of the projections and intermediate flat faces. Each of these jaws consists of a bar of metal, the upper edge face of which is beveled downward and outward at its upper outer corner, as at 12. The ends of each jaw are left plain, as at 13, only the middle portion of the jaw being formed with the projections and recesses to be hereinafter described. The jaws are normally held apart by the springs 14 but are adapted to be forced together by means of the clamps which engage the plain ends of the jaws, one of which clamps is shown in detail in Figure 2. The clamp consists of the two arms 15 pivoted at their upper ends, as at 16, and at their lower ends having balls 17 which engage in ball seats 18 formed in the jaws. These arms are forced towards each other by means of the screws or bolts 19 which are rotatably mounted in one of the arms and have screw threaded engagement in the other arm. Each of these screws has a head 19ª formed to receive a wrench. One of the jaws, as for instance, the jaw 10, is provided with outwardly projecting screws 20 to engage the slotted base 21 of a depth gauge. These gauges are disposed inward of but adjacent the clamping arms 15. From the base 21 extends upward an arm 22 which is angularly bent or extended transversely of the jaw 10 and then is provided with the downwardly extending portion 23, the lower end of which is brought to a sharp edge and is adapted to be disposed across the edge of the saw between the two jaws, as shown most clearly in Figure 2. The slot 24 in the base 21 permits the depth gauge to be adjusted vertically and thus to adjustably limit the extent of protrusion of the saw A above the upper edges of the saw engaging jaws. The side face of the jaw 10 is provided with graduations 25 and the base 21 has an index mark coacting with these graduations. It is to be understood that the jaws as shown are adapted for an eight-tooth saw, that is, a saw having eight teeth to the inch, but that there will be a number of these jaws, each pair of jaws being adapted to a saw having a different number of teeth to the inch.

As shown best in Figures 3 to 6, the upper margin of each jaw 10 or 11 is provided with a plurality of upwardly and inwardly extending projections designated 26, the inner faces of which projections are upwardly and inwardly beveled at a certain definite angle, as shown best in Figures 4, 5 and 6. Each pair of these projections or lugs 26 are spaced from each other by a vertical flat intermediate face 27, this face 27 being disposed in the same plane as the inner face of the corresponding jaw or die. It will be seen from Figure 6, therefore, that when these dies are forced towards each other by means of the clamping devices shown in Figure 2, the alternate teeth of the saw will be bent over in opposite directions and to an extent permitted by the angular faces of the projections 26.

After the teeth of the saw have been bent or "set" to the proper angle, as shown in Figure 6, it is necessary to file these teeth and to that end the upper edge of each jaw is formed with V-shaped notches 28 which extend across the upper face, as shown in Figure 3, between each projection 26 and the corresponding flat faced portion 27. As shown in Figure 3, these notches 28 are at an angle to the inner face of the jaw less than a right angle and it will be seen also from Figure 3 that these notches 28 are disposed alternately in reverse angular directions so that between each pair of projections 26 the notches converge outward on one jaw, as for instance, the die 11, and converge inward complementarily on the jaw 10. These notches 28, therefore, constitute file guides when the jaws are brought together.

The depth to which the file will bite is controlled by the depth gauges, these being set according to the graduation marks 25 and bearing upon the upper edge of the saw between the teeth thereof so that the file cannot cut any deeper than is permitted by the depth gauges.

It will be seen from Figures 1 and 2 that the downwardly extending portions 23 extend transversely of the space between the two jaws 10 and 11 and, therefore, extend down between the teeth of the saw and between the teeth of the jaws. These gauges, therefore, may be disposed and are disposed in the valley between two teeth in order to gauge the depth of set and also to gauge the filing. By disposing the portion 23 of each gauge in the valley between two teeth, the gauge holds the tool from moving horizontally with relation to the saw and, furthermore, because this portion 23 extends into the valley between two teeth of the saw and into the valley between two teeth of a jaw, the gauge causes the teeth 26 or projections of the jaws to come directly in line with the teeth of the saw.

It is to be understood that there will be a separate pair of dies 10 and 11 for each size of saw. The drawing illustrates on an enlarged scale a saw set and file guide for a saw having eight teeth to the inch and there will be another pair of dies or jaws having the projections set nearer to each other or further apart from each other, depending upon the saw for which the dies are adapted. By the use of this device, the saws may not only be set but may be accurately filed to any depth desired depending upon the set of the depth gauges.

It will be seen that each projecting portion 26 is triangular in face view, as indicated clearly in Figure 3, and thus each projecting portion will have an area of the same shape as and of the same area as the teeth which it engages. Thus the projections on each jaw fully cover each saw tooth eliminating any possible breakage of the saw teeth.

What is claimed is:—

1. A saw set including two opposed elongated parallel jaws between which a saw is adapted to be clamped, and means for forcing said jaws toward each other without changing the parallelism of the jaws, the upper inner face of each jaw being formed with alternately inwardly and upwardly beveled triangular projections and intermediate relatively depressed portions, the triangular projections of one jaw being opposed to the relative depressed portions of the opposed jaw, the upper edge face of each jaw having a pair of transverse V-shaped filing notches between and defining said projections, the notches being disposed at less than a right angle to the inner face of the corresponding jaw and extending alternately in opposite directions.

2. A saw set including two opposed elongated jaws between which a saw is adapted to be clamped, and means for forcing said jaws toward each other, the upper inner face of each jaw being provided with alternate inwardly and upwardly beveled projections and intermediate flat portions disposed in the plane of the jaw, the projections of one jaw being opposed to the flat portions of the opposed jaw, the upper edge face of each jaw having transverse V-shaped filing notches defining said projections, the notches being at less than a right angle to the inner face of the corresponding jaw and extending alternately in opposite directions.

3. A saw set including two opposed elongated jaws between which a saw is adapted to be clamped, means for forcing said jaws toward each other, the upper inner face of each jaw being provided with alternate inwardly and upwardly beveled projections and intermediate relative depressed portions, the projections of one jaw being opposed to the relatively depressed portions of the opposed jaw, vertically adjustable gauges mounted upon opposite ends of one of said jaws, each gauge comprising a base plate disposed flat against the outer face of the jaw and vertically slotted, and a set screw passing through the slot, the base having an upwardly extending portion which at its upper end extends laterally and then downwardly so as to be disposed transversely of the space between the jaws and acting to limit the position of a saw with relation to the jaws, the jaw having a vertical series of graduations and the base plate having an index associated with said graduations.

4. A saw set including two opposed elongated jaws between which a saw is adapted to be clamped, springs urging said jaws apart, the upper inner face of each jaw being formed with alternately inwardly and upwardly beveled projections and intermediate portions depressed relative to said projections, the projections of one jaw being opposed to the relatively depressed portions of the opposed jaws, and means for forcing said jaws toward each other comprising arms pivoted at their upper ends and at their lower ends formed with balls, the jaws having seats for said balls, and a screw having a head bearing against one of said arms and screw threads engaging the opposed arm, said clamping means being disposed at opposite ends of the jaws.

5. A saw set including two opposed elongated jaws between which a saw is adapted to be clamped, means for forcing said jaws toward each other, the upper inner face of each jaw being provided with alternately inwardly and upwardly beveled projections and intermediate relatively depressed portions, the projections of one jaw being opposed to the relatively depressed portions of the opposed jaw, and vertically adjustable gauges mounted upon opposite ends of one of said jaws and extending upward above and then transversely of said jaws, each gauge having a depending relatively thin blade-like portion extending transversely of the jaws and disposed to extend across the jaws and rest thereon upon the edge face of the saw.

STANLEY W. MARSH.
HARRY H. DAVIES.